United States Patent [19]
Stolzer

[11] 3,977,542
[45] Aug. 31, 1976

[54] STORAGE FRAMES WITH DEFLECTION BAR TO PIVOT TINES ON A GANTRY

[75] Inventor: Paul Stolzer, Achern, Germany

[73] Assignee: STOPA Stahlbau GmbH & Co. Kommanditgesellschaft fur Schweisstechnik, Achern-Gamshurst, Germany

[22] Filed: May 31, 1974

[21] Appl. No.: 475,242

[30] Foreign Application Priority Data
July 26, 1973  Germany............................ 2337907

[52] U.S. Cl............................ 214/16.4 A; 214/730; 214/750
[51] Int. Cl.².......................................... B65G 1/06
[58] Field of Search............... 214/16.4 A, 750, 730, 214/731, 16 B, 16.4 B; 104/88

[56] References Cited
UNITED STATES PATENTS

| | | | |
|---|---|---|---|
| 2,995,263 | 8/1961 | Fitch.................................. | 214/731 |
| 3,092,268 | 6/1963 | Powers............................ | 214/730 X |
| 3,096,896 | 7/1963 | Norton et al. ..................... | 214/730 |
| 3,232,465 | 2/1966 | Romine et al. .................... | 214/730 |
| 3,445,010 | 5/1969 | Alstedt et al. .................. | 214/16.4 D |
| 3,512,672 | 5/1970 | Carpenter.......................... | 214/730 |
| 3,545,636 | 12/1970 | Yarbrough.......................... | 214/731 |
| 3,567,055 | 3/1971 | Preto ................................. | 214/730 |
| 3,598,264 | 8/1971 | Massle .............................. | 214/730 |
| 3,667,618 | 6/1972 | Bertola ....................... | 214/16.4 A X |

FOREIGN PATENTS OR APPLICATIONS

| | | | |
|---|---|---|---|
| 78,440 | 6/1962 | France................................. | 104/88 |
| 1,253,164 | 10/1967 | Germany.......................... | 214/16 B |
| 1,229,001 | 11/1966 | Germany ........................... | 214/750 |
| 161,283 | 3/1964 | U.S.S.R............................ | 214/750 |

*Primary Examiner*—Robert J. Spar
*Assistant Examiner*—R. B. Johnson
*Attorney, Agent, or Firm*—Spencer & Kaye

[57] ABSTRACT

A storage system includes a plurality of aligned moveable storage frames for accommodating articles for storage and a gantry movable along the storage frames. The gantry supports, for vertical reciprocation, a horizontal cross beam carrying a plurality of article-handling tines for removing articles from, or depositing them in selected compartments of desired storage frames. Each tine is formed of two tine arms joined at right angles and is swingable into two mutually perpendicular positions for changing the orientation of the tine. For any one article-handling operation only one tine arm is active while the other is idle. Each storage frame carries a horizontal deflection bar to cause a tine to change its angular position when its horizontally extending tine arm abuts a deflection bar as the cross beam is lowered in between two storage frames.

13 Claims, 4 Drawing Figures

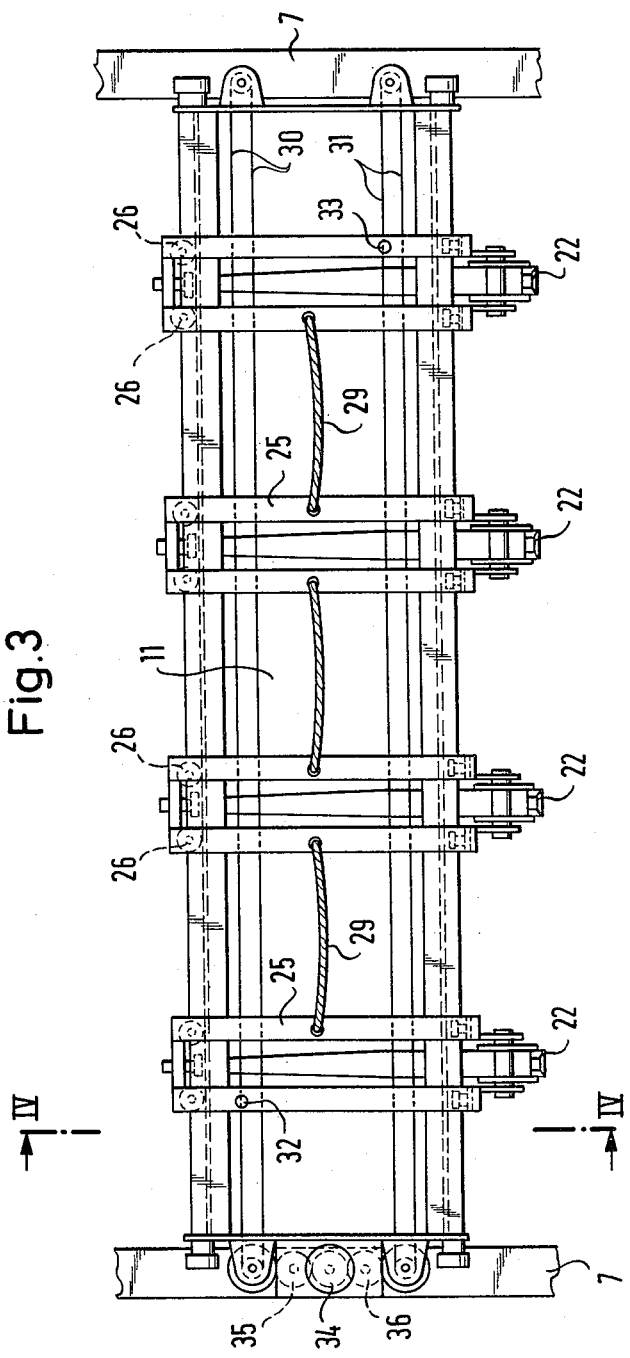

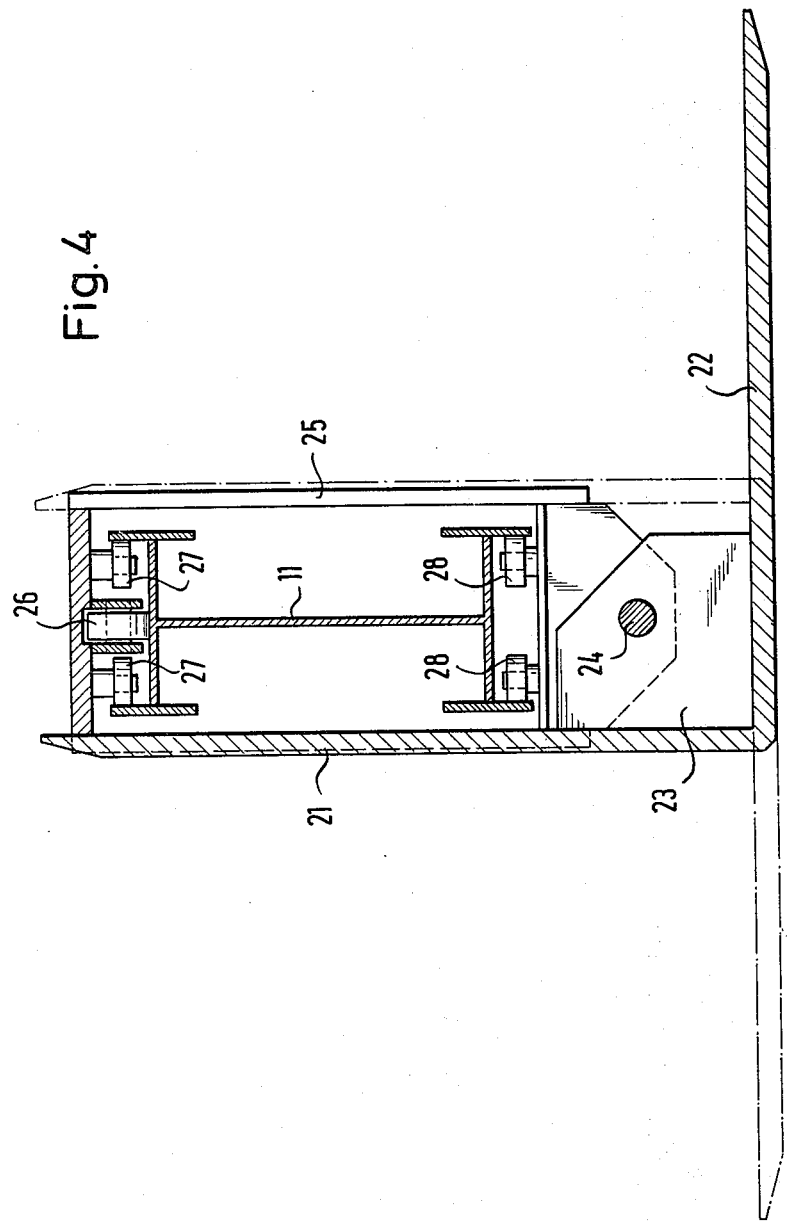

STORAGE FRAMES WITH DEFLECTION BAR TO PIVOT TINES ON A GANTRY

BACKGROUND OF THE INVENTION

This invention relates to a storage system of the type including storage frames which are aligned with one another in the direction of depth of the storage space. Each storage frame is provided with a plurality of superposed racks which extend horizontally in the direction of depth of the storage space. The racks in each storage frame form at least two vertical series; the racks in one series are paired off with the racks of the other vertical series to define superposed, horizontally extending storage compartments accessible from both, opposite sides of the storage frame. The storage system further includes a gantry which travels in the direction of depth of the storage space and which bridges the storage frames. Between the vertical columns of the gantry there is supported a horizontal cross or transverse beam which may be moved vetically beyond the height of the storage frames. The cross beam extends in the direction of width of the storage space and is provided with article-handling means for removing or depositing articles through the sides of the storage frames.

A storage system of the above-outlined type is known and is disclosed, for example, in the German Auslegeschrift (Published Patent Application) No. 1,222,857. In the system described therein there are provided, below the cross beam of the gantry, a plurality of article-handling tines which are either stationary or are rotatable about a vertical axis through an angle of at least 180° by means of a remotely controlled drive mechanism.

In case the tines in the above-outlined known structure are stationarily arranged, the distance between the storage frames has to be dimensioned in such a manner that the cross beam, including the projecting tines on both sides, has sufficient space therebetween. This requires a relatively large storage space because between the storage frames one has to ensure sufficient space for the tines on that side of the cross beam which has no active role during any particular article removing or depositing operation.

If, on the other hand, the tines are rotatably supported, they require the above-noted remote controlled drive for their adjustment to the necessary work position. This renders the apparatus more expensive and complex. Also, in the latter case accidents may occur if, due to a malfunctioning, one of the tines does not assume the desired work position. Further, due to such a rotary support, a tilting about an axis perpendicular to the rotary axis occurs when the tines are loaded. As a result, at the marginal zones of the rotary suppport stresses develop which, as known, lead rapidly to appreciable wear and thus to a deterioration of the stability and accuracy of storage.

Further, in the known storage system the storage frames are stationary so that between any two adjacent storage frames the required distance for accommodating the cross beam, including the tines, is at all times maintained. This, however, except for the momentary work position of the gantry where such a space between two storage frames has to be present, leads to unused, dead spaces which, in view of the high cost of storage, appreciably decrease the degree of economic utilization of such storage systems.

Further, the known storage system is adapted to store practically only rod-like material so that its utility with respect to differently shaped articles is substantially limited.

SUMMARY OF THE INVENTION

It is an object of the invention to provide an improved storage system of the above-outlined type from which the discussed disadvantages are eliminated by economical measures.

More particularly, it is an object of the invention to provide an improved storage system of the above-outlined type in which the spatial requirements for the system are limited to a minimum value and in which it is possible to store and handle goods of various types, particularly those arranged on pallets.

These objects and others to become apparent as the specification progresses, are accomplished by the invention according to which, briefly stated, each tine is formed of two tine arms joined at right angles and is swingable into two mutually perpendicular positions for changing the orientation of the tine. For any one article-handling operation only one tine arm is active, while the other is idle. Each storage frame carries a horizontal deflection bar to cause a tine to change its angular position when its horizontally extending tine arm abuts a deflection bar as the cross beam is lowered in between two storage frames.

By virtue of the invention as outlined above, it is possible to limit the distance between two storage frames to the spatial requirement for the cross beam including the length of the momentarily required (active) tine arm of each tine without the need of a particular drive for changing the position of the tine. This is so, because when the cross beam is moved in between two storage frames, the idle arms of the tines — if such arms are in a horizontal position — abut the deflection bars and are, as a result, tilted upwardly, out of the way. At the same time, the other active tine arms arrive in a simple manner and without the possibility erroneous settings, into the required work position. It is expedient to arrange the deflection bars in a recessed manner with respect to the forward end of the racks of the associated storage frames. This ensures that the location of engagement between a deflection bar and a tine arm is at a substantial distance from the pivotal support of the tine and thus an excessively sharp or rapid swinging motion of the tine is prevented. The deflection bars should be arranged above the highest rack of the storage frame with such a vertical spacing that upon tilting of the tines no collision will occur with the articles situated on the upper racks.

To make possible the storage of not only rod-like items, but also differently shaped articles, it has been proven particularly advantageous to arrange the pivotal support of the tines on brackets which are movable on and in the longitudinal direction of the cross beam. Expediently, the brackets are movable automatically. Adjoining brackets may be interconnected with one another and each of the two outermost brackets may be displaceable by a drive-operated endless traction mechanism arranged along the length dimension of the cross beam. This feature makes possible to automatically move the tines close to one another in such a manner that, for example, a loaded pallet may be engaged therewith without grasping, at the same time, the adjacent articles stored at the same height. Further, by virtue of the interconnection between the tine brackets, for example by means of a cable or cord, only the outermost brackets have to be moved by the drive mechanism when the tine brackets are to be moved away from one another. The movement of each outermost tine bracket may be effected by two separate traction mechanisms. It is expedient, however, to connect the oppositely working traction devices to a common drive mechanism by means of a clutch.

A substantial space saving may be effected if the storage frames are moveable in the direction of depth of the storage space so that they may be crowded side-by-side generally without distance therebetween, while a suitable spacing is ensured only between those two storage frames between which the cross beam has to be passed for removing or depositing the articles. The above-noted displacement of the storage frames may be effected in a particularly simple manner by coupling the storage frames by a pawl or other means to the gantry so that the latter may simultaneously serve as the driving means for displacing the storage frames.

BRIEF DESCRIPTION OF THE DRAWINGS

FIG. 3 is an enlarged front elevational view of a component shown in FIG. 2.

FIG. 4 is a partial sectional view taken along line IV—IV of FIG. 3.

DESCRIPTION OF THE PREFERRED EMBODIMENTS

Figure 1:
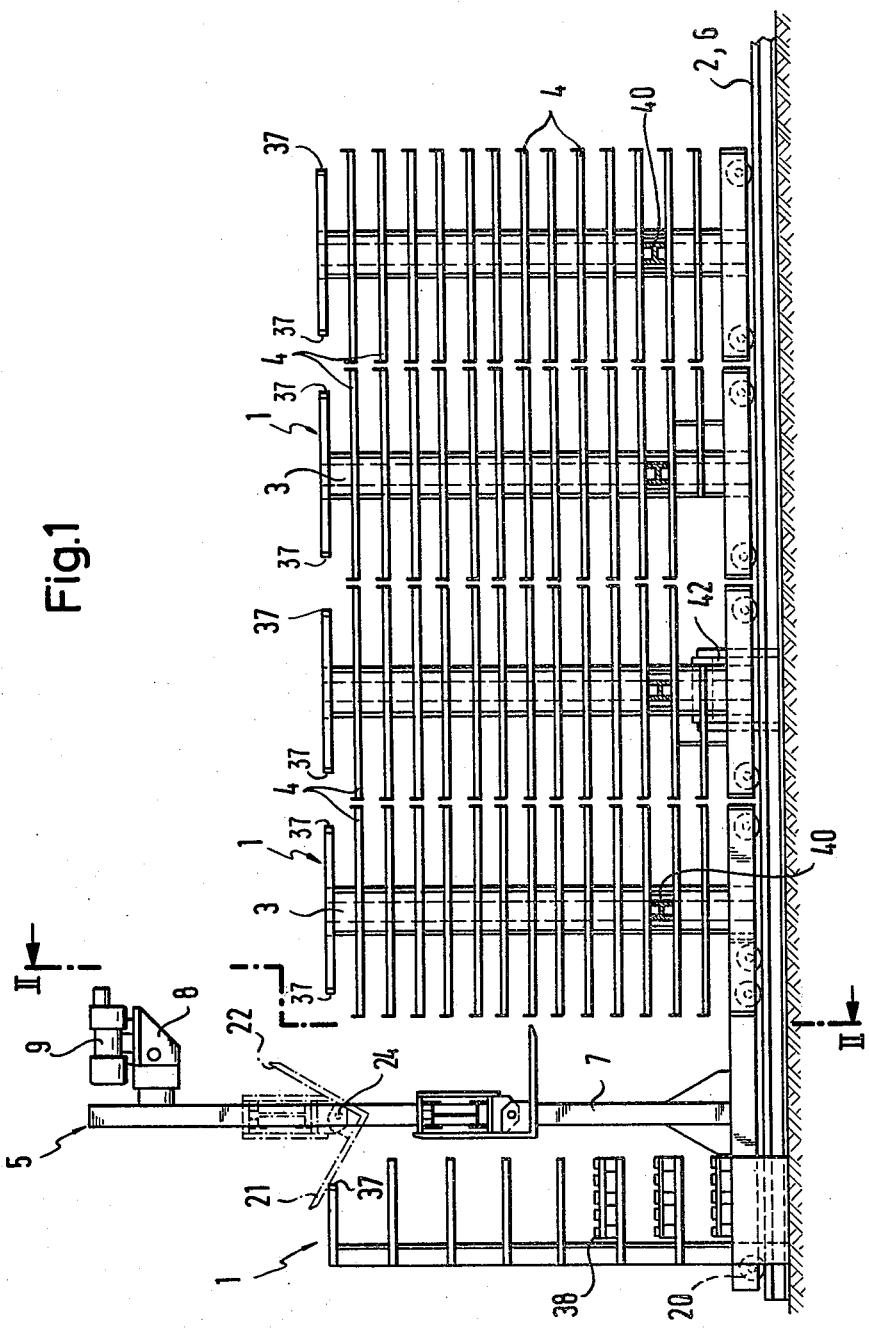
FIG. 1 is a side elevational view of a preferred embodiment of the invention.
Figure 2:
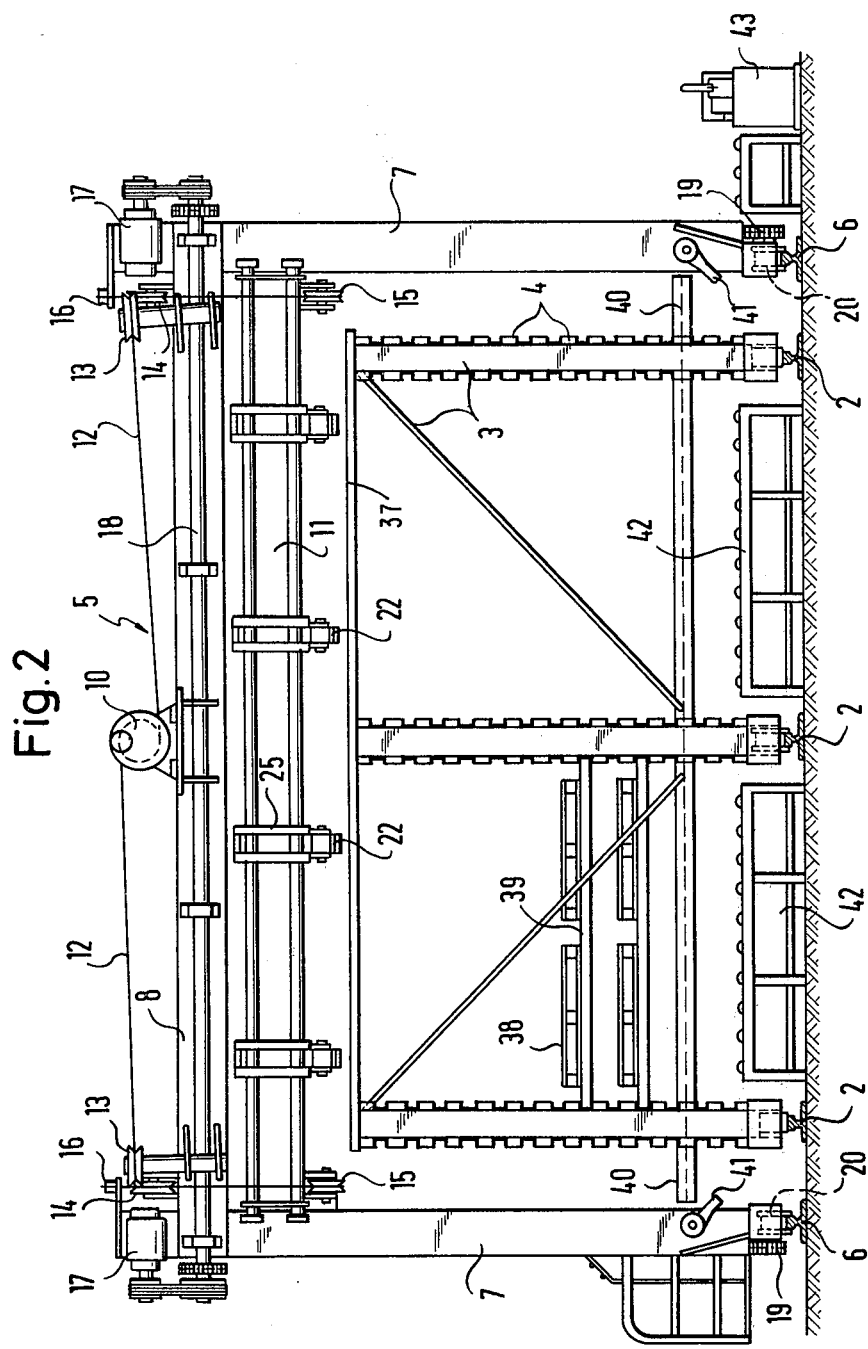
FIG. 2 is a front elevational view taken along line II—II of FIG. 1.

Turning now to FIGS. 1 and 2, there is shown a storage system which has a plurality of storage frames 1 disposed in an aligned series in the direction of depth of the storage space. The storage frames 1 may travel by means of rollers on rails 2 oriented in a direction parallel to the depth of the storage space. Each storage frame 1 has uprights 3 which carry several rows of superposed racks 4 which define storage compartments.

The storage frames 1 are bridged by a gantry 5 which is movable on rails 6 in the direction of depth of the storage space and which is formed of vertical columns 7 and a horizontal gantry bridge 8 extending above the storage frames 1.

On the gantry bridge 8 there is mounted a drive mechanism including a motor 9 and a cable drum 10 for hoisting or lowering a horizontal cross beam 11 which is guided vertically displaceably between the vertical columns 7 of the gantry 5 and which is arranged generally parallel to the gantry bridge 8. The cross beam 11 is oriented in the direction of width of the storage space. For effecting the up and down movement of the cross beam 11, from the cable drum 10 there extend traction cables 12 which are deflected downwardly by rollers 13 and 14 and are further trained about end rollers 15 rotatably supported on the cross beam 11. The ends of the cables 12 are affixed to the gantry 5 at 16.

The gantry bridge 8 further carries two drive motors 17 for moving the gantry 5. The drive motors 17, which are synchronized with one another by means of a common shaft 18, drive chains 19 which run within the column 7. The chains 19, in turn, drive wheels 20 which are supported at the bottom of the vertical columns 7 and which run on the rails 6 oriented in the direction of depth of the storage space.

As it is shown in more detail in FIGS. 3 and 4, the cross beam 11 carries several juxtapositioned tines, each formed of two tine arms 21 and 22 fixedly joined at right angles to one another. Each tine 21, 22 is, by means of gusset plates 23 and a pin 24 pivotally mounted on a bracket 25 in such a manner that the range of the swinging motion of the tine extends between two mutually perpendicular positions of the tine arms 21 and 22. The plane in which each tine pivots is parallel to the direction of depth of the storage space. Each bracket 25 constitutes an abutment for the tine arms 21 and 22 to determine both terminal positions of the tines 21, 22. As it may be observed in FIG. 4, one terminal position of the tine is shown in full lines. In this terminal position the tine arm 21 (the inoperative, or idle tine arm) is disposed vertically and abuts the bracket 25. The other tine arm 22 (the operative, or active tine arm) extends horizontally. The other terminal position of the tine is shown in dash-dot lines. In this terminal position the tine arm 22 (the idle tine arm) is disposed vertically and abuts the bracket 25. The other tine arm 21 (the active tine arm) extends horizontally. It may thus be observed that in their active positions, the tine arms 21 and 22 are oriented in opposite, substantially horizontal directions.

As it may be further observed from FIGS. 3 and 4, the brackets 25 are movable along the cross beam 11 and are supported thereon by means of carrier rollers 26 and guide rollers 27, 28.

Turning once again to FIG. 3, it is seen that adjoining brackets 25 are connected to one another by means of a cord 29. Further, the two outermost brackets 25 are connected fixedly with traction mechanisms 30 and 31 at 32 and 33, respectively. The traction mechanisms 30 and 31 are disposed in the longitudinal direction of the cross beam 11 and may be constituted by endless cables driven by a common drive motor 34 through respective clutches 35 and 36.

In the description that follows, the operation of the above-discussed storage system will be set forth.

Turning once more to FIGS. 1 and 2, as the cross beam 11 is lowered in between two storage frames 1 for the purpose, for example, of removing articles disposed on that storage frame 1 that is to the right of the gantry 5 viewed in FIG. 1, all the tines 21, 22 are automatically swung into a position in which each tine arm 21 is oriented vertically while each tine arm 22 is oriented horizontally. If, for example, a tine arm 21 were, in this phase, in a horizontal position and the tine arm 22 in a vertical position, the tine arm 21 (which is now the idle arm) would abut against the deflection bar 37 of the storage frame that is situated to the left of the gantry 5, and would thus be swung clockwise upwardly, whereby the tine arm 22 (which is now the active arm) would be moved into its desired working position. In this working position, then, the tines 21, 22 may withdraw articles disposed on that storage frame that is disposed to the right of the gantry 5 without the necessity of providing, between this storage frame and the one adjoining it to the left, a greater space than required for the cross beam 11, including the tines 21, 22 in their above-described proper work position. This particularly applies to the setting of the tines 21, 22 observable in FIG. 3 and related to the longitudinal direction of the cross beam 11, for cases where rod-like articles are to be moved, the length of which extends substantially beyond the width (as measured in the plane of FIG. 2) of the storage frame 1.

In case the storage frames 1 accommodate shorter rod-like articles or if they store, for example, pallets 38 on beams 39 that complement the racks 4 into shelves, the tines 21, 22 are pushed together by moving the brackets 25 towards one another by means of a drive mechanism 30 - 36 provided for this purpose, in order to prevent engagement, by the tines, of other pallets in addition to the pallet 38 to be removed from the beam 39. Subsequently, for example, to engage longer, rod-like articles, the brackets 25 and thus the tines 21, 22 may again be moved away from one another. During this operation the brackets 25 disposed between the outermost brackets are moved and distributed uniformly by the cords 29.

As it has been described before, the storage frames 1 are movable on rails 2 towards and away from one another. The purpose of this arrangement is to eliminate unnecessary spacings between adjoining storage frames. It is again noted that only between those two adjacent storage frames is there a space required, in between which the cross beam 11, with the tines 21, 22, is to be moved vertically for gaining access to the rack or racks 4 of one particular storage frame. For shifting the storage frames 1 on the rails 2, the storage frames 1 are, by means of laterally and horizontally projecting beams 40, releasably coupled to pawls 41 which are swingably mounted to the vertical columns 7 of the gantry 5. In this manner one or more storage frames can be displaced by the gantry 5 in order to provide a space merely between those two adjoining two storage frames where articles are to be removed or deposited.

Below the storage frames 1 there are mounted roller conveyors 42 to receive articles that are removed from or that are to be deposited on the racks of the storage frames. These conveyors may be arranged, for example, along a horizontal center line extending in the direction of width of the storage space. As seen in FIG. 2, between uprights 3 of a storage frame and the conveyors 42 there is provided sufficient free space to ensure a displacement without the danger of collision between conveyor and storage frame. It is also feasible to provide a plurality of parallel-arranged conveyors extending in the direction of width of the storage space for thus obviating the necessity of displacing the storage frames before or after access to the respective rack compartment, for gaining access to a single central conveyor. In such an arrangement, however, care should be taken that all the storage frames that may be in the zone of such conveyors have a sufficient space with respect thereto.

The above-described storage system may serve, for example, to store material for supplying one or more cold circular saws 43 (FIG. 2).

It will be understood that the above description of the present invention is susceptible to various modifications, changes and adaptations, and the same are intended to be comprehended within the meaning and range of equivalents of the appended claims.

I claim:
1. In a storage system including a plurality of storage frames aligned in the direction of depth of a storage space, each storage frame having a plurality of horizontal, vertically spaced racks forming compartments for accommodating articles for storage; the racks extending in the direction of depth of the storage space and having free ends; a gantry movable in the direction of depth of the storage space, the gantry having a bridge and vertical columns supporting the bridge extending above the storage frames in the direction of width of the storage space; a cross beam supported between the vertical columns of the gantry and extending in the direction of width of the storage space; article handling means carried by the cross beam for removing articles from or depositing articles onto selected ones of the racks; and a hoisting mechanism for vertically raising said cross beam beyond the height of said storage frames and for lowering said cross beam into the space between two selected ones of said storage frames; the improvement comprising in combination:
 a. a plurality of tines each formed of two tine arms joining one another substantially at right angles; said tines forming said article handling means;
 b. support means for mounting each said tine on said cross beam for displacement therealong;
 c. means for pivotally securing each said tine to the respective support means to provide for a swinging movement of each tine in a plane parallel to the direction of depth of the storage place through an angle of approximately 90°, whereby each tine has two mutually perpendicular positions in each of which one of the tine arms extends substantially horizontally in the direction of depth of the storage space and the other of the tine arms extends substantially vertically upwardly; and
 d. a deflection bar affixed to each storage frame above the uppermost racks thereof, said deflection bar extending parallel to said cross beam and perpendicularly to said racks and being arranged for cooperating with said tines by abutting the horizontally extending tine arms during lowering of said cross beams from above said storage frames for swinging the tines from one of their positions into the other, whereby said tines are moved to a load receiving position when they are lowered between two storage frames; said deflection bars being recessed with respect to the free ends of the racks.

2. A storage system as defined in claim 1 wherein said means for pivotally securing said tines are disposed below said cross beam.

3. A storage system as defined in claim 1, wherein said means for pivotally securing said tines include gusset plates, one affixed to each of said tines in the zone of connection between the two tine arms; and a pivot pin held by said supporting means and passing through the gusset plate.

4. A storage system as defined in claim 1, said support means including a separate bracket for each tine, each bracket including means for mounting said bracket on said cross beam for said displacement therealong.

5. A storage system as defined in claim 4, wherein each bracket including parts for abutting the one and the other tine arm in their respective upwardly oriented vertical position to define a limit for the swinging motion of the tine.

6. A storage system as defined in claim 4, including means for displacing said brackets along said cross beam.

7. A storage system as defined in claim 6, wherein said means for displacing said brackets includes cord means interconnecting adjoining brackets with one another and traction means supported by and extending parallel to said cross beam, said traction means being attached to two outermost ones of said brackets for displacing the latter along said cross beam.

8. A storage system as defined in claim 7, wherein said traction means includes two separate, endless traction mechanisms, one being connected to the one outermost bracket and the other being connected to the other outermost bracket; said means for displacing said brackets further includes a common drive means carried by said cross beam and clutch means for connecting said endless traction mechanisms to the outermost brackets.

9. A storage system as defined in claim 4, said means for mounting each bracket on said cross beam including roller means for engaging said cross beam.

10. A storage system as defined in claim 1, further including means for displacing said storage frames relative to one another in the direction of depth of the storage space.

11. A storage system as defined in claim 10, further including means for releasably connecting said storage frames to said gantry for displacing said storage frames by and during the motion of said gantry in the direction of depth of the storage space.

12. A storage system as defined in claim 11, wherein said means for releasably connecting said storage frames to said gantry includes a component affixed to each storage frame and extending in the direction of width of the storage space beyond the outline of the storage frame; and pawl means carried by the vertical columns of the gantry for releasably and force-transmittingly engaging said component.

13. A storage system as defined in claim 12, said component is a beam affixed to each storage frame and projecting, on both sides, beyond the outline of the storage frame in the direction of width of the storage space.

* * * * *